(12) United States Patent
Wang et al.

(10) Patent No.: US 9,041,764 B2
(45) Date of Patent: May 26, 2015

(54) METHOD, DEVICE, AND SYSTEM FOR HIGHLIGHTING PARTY OF INTEREST IN VIDEO CONFERENCING

(71) Applicant: Huawei Technologies Co., Ltd., Shenzhen (CN)

(72) Inventors: Zongbo Wang, Nanjing (CN); Ying Lu, Nanjing (CN); Shilu Ma, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/036,890

(22) Filed: Sep. 25, 2013

(65) Prior Publication Data
US 2014/0022332 A1    Jan. 23, 2014

Related U.S. Application Data

(63) Continuation of application No. PCT/CN2012/072077, filed on Mar. 8, 2012.

(51) Int. Cl.
  *H04N 7/15*   (2006.01)
  *H04M 3/56*   (2006.01)
  *H04N 7/14*   (2006.01)

(52) U.S. Cl.
  CPC .............. *H04N 7/157* (2013.01); *H04M 3/567* (2013.01); *H04M 3/569* (2013.01); *H04N 7/147* (2013.01)

(58) Field of Classification Search
  USPC ........................................... 348/14.01–14.09
  See application file for complete search history.

(56) References Cited

U.S. PATENT DOCUMENTS

| | | | |
|---|---|---|---|
| 8,436,888 B1* | 5/2013 | Baldino et al. | 348/14.08 |
| 2003/0035001 A1 | 2/2003 | Van Geest et al. | |
| 2005/0099492 A1 | 5/2005 | Orr et al. | |
| 2009/0015657 A1* | 1/2009 | Wong | 348/14.08 |
| 2011/0285807 A1* | 11/2011 | Feng | 348/14.08 |

FOREIGN PATENT DOCUMENTS

| | | |
|---|---|---|
| CN | 1541485 A | 10/2004 |
| CN | 101080000 A | 11/2007 |

(Continued)

OTHER PUBLICATIONS

Foreign Communication from a Counterpart Application, Chinese Application No. 201280000307.0, Office Action dated Jan. 26, 2014, 10 pages.
Foreign Communication From a Counterpart Application, PCT Application No. PCT/CN2012/072077, Chinese Search Report dated Dec. 13, 2012, 6 pages.
Foreign Communication From a Counterpart Application, PCT Application No. PCT/CN2012/072077, Chinese Written Opinion dated Dec. 13, 2012, 5 pages.

*Primary Examiner* — Joseph J Nguyen
(74) *Attorney, Agent, or Firm* — Conley Rose, P.C.; Grant Rodolph; Nicholas K. Beaulieu

(57) ABSTRACT

Embodiments of the present invention provide a method, device, and system for highlighting a party of interest in video conferencing, relating to the communication field and capable of effectively utilizing network bandwidth and enhancing conference efficiency. The method includes: converting received audio and video signals sent by multiple conferencing terminals into multiple independent video images corresponding to the multiple conferencing terminals, and displaying the multiple video images through a display device; and adjusting display factors of the multiple video images according to obtained video image display priority signals, so that the multiple video images present different visual characteristics in the display device. The embodiments of the present invention are applied in video conferencing.

11 Claims, 4 Drawing Sheets

(56) References Cited

FOREIGN PATENT DOCUMENTS

| CN | 101557495 A | 10/2009 |
| CN | 102025970 A | 4/2011 |
| EP | 2018058 A1 | 1/2009 |

\* cited by examiner

METHOD, DEVICE, AND SYSTEM FOR HIGHLIGHTING PARTY OF INTEREST IN VIDEO CONFERENCING

CROSS-REFERENCE TO RELATED APPLICATION

This application is a continuation of International Application No. PCT/CN2012/072077, filed on Mar. 8, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communication field, and in particular, to a method, device, and system for highlighting a party of interest in video conferencing.

BACKGROUND

Video conferencing is developed to meet requirements for visual communication, long-distance contact, and so on. Video conferencing is a means of information interaction which is frequently used in modern communication. By means of video conferencing, participants can perform communication through a video no matter where they are, which is very convenient.

In an existing video conferencing system, every video conferencing terminal displays video images of all participants in a conference without showing any difference and cannot effectively highlight a party of interest among the participants, thereby affecting conference efficiency.

SUMMARY

Embodiments of the present invention provide a method and device for highlighting a party of interest in video conferencing, capable of effectively highlighting a party of interest among participants and enhancing conference efficiency.

To achieve the preceding objectives, the embodiments of the present invention adopt the following technical solutions:

A method for highlighting a party of interest in video conferencing includes: receiving audio and video signals sent by multiple conferencing terminals; converting the received audio and video signals sent by the multiple conferencing terminals into multiple independent video images corresponding to the multiple conferencing terminals, and displaying the multiple video images through a display device; and obtaining video image display priority signals, and adjusting display factors of the multiple video images according to the obtained video image display priority signals, so that the multiple video images present different visual characteristics in the display device.

A device includes: a receiving unit configured to receive audio and video signals sent by multiple conferencing terminals; a displaying unit configured to convert the received audio and video signals sent by the multiple conferencing terminals into multiple independent video images corresponding to the multiple conferencing terminals, and display the multiple video images through a display device; and a processing unit configured to obtain video image display priority signals, and adjust display factors of the multiple video images according to the obtained video image display priority signals, so that the multiple video images present different visual characteristics in the display device.

A system includes: an audio and video input port configured to receive audio and video signals sent by multiple conferencing terminals; and a processor configured to: convert the received audio and video signals sent by the multiple conferencing terminals into multiple independent video images corresponding to the multiple conferencing terminals, and display the multiple video images through a display device; and obtain video image display priority signals, and adjust display factors of the multiple video images according to the obtained video image display priority signals, so that the multiple video images present different visual characteristics in the display device.

Embodiments of the present invention provide a method, device, and system for highlighting a party of interest in video conferencing. Received audio and video signals sent by multiple conferencing terminals are converted into multiple independent video images corresponding to the multiple conferencing terminals, and the multiple video images are displayed through a display device; and display factors of the multiple video images are adjusted according to obtained video image display priority signals, so that the multiple video images present different visual characteristics in the display device. Thereby, a participant of interest to a user can be effectively highlighted, and conference efficiency is enhanced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following descriptions show merely some embodiments of the present invention, and persons of ordinary skill in the art may still derive other accompanying drawings according to the accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part of embodiments of the present invention rather than all of the embodiments. All other embodiments obtained by persons of ordinary skill in the art based on the embodiments of the present invention without creative efforts shall fall within the protection scope of the present invention.

Embodiment 1

Figure 1:
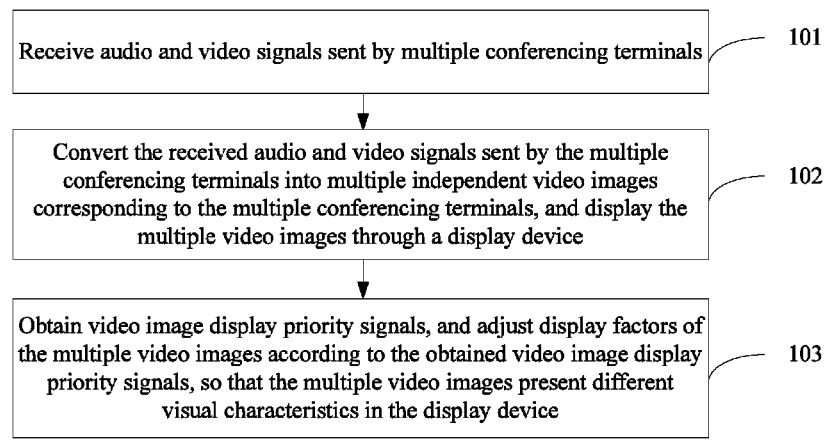
FIG. 1 is a schematic flowchart of a method for highlighting a party of interest in video conferencing according to Embodiment 1.

The embodiment of the present invention provides a method for highlighting a party of interest in video conferencing. As shown in FIG. 1, the method includes the following steps:

101. Receive audio and video signals sent by multiple conferencing terminals.

In video conferencing, each participant has a conferencing terminal, where the conferencing terminal may send audio and video signals of the participant to conferencing terminals of other participants, and may also receive audio and video signals sent by the other conferencing terminals.

In this embodiment, in video conferencing, the conferencing terminal A configured for the participant A may receive audio and video signals sent by multiple other conferencing terminals in the video conferencing.

102. Convert the received audio and video signals sent by the multiple conferencing terminals into multiple independent video images corresponding to the multiple conferencing terminals, and display the multiple video images through a display device.

In this embodiment, the conferencing terminal A may convert the received audio and video signals into video images, and display the video images on a display device of the conferencing terminal A. It should be noted that the process of converting and displaying video images is based on the prior art, and is not further described herein.

By performing this step, the participant A may see video images of other participants through the display device of the conferencing terminal A.

103. Obtain video image display priority signals, and adjust display factors of the multiple video images according to the obtained video image display priority signals, so that the multiple video images present different visual characteristics in the display device.

When the display device of the conferencing terminal A displays the video images of the other participants, the conferencing terminal A may obtain video image display priority signals, where the video image display priority signals may indicate the priorities of the video images displayed by the display device.

Optionally, a user, namely, the participant A, may perform a selective input on the multiple video images, for example, click a video image of a participant of interest to the user; in this case, the selective input of the participant A is the video image display priority signals. The conferencing terminal A adjusts display factors of the multiple video images directly according to the received selective input of the participant A, namely, the video image display priority signals, so that the multiple video images present different visual characteristics in the display device. Optionally, a video image selected by the selective input has the highest video image priority, and video images that are not selected have priorities lower than that of the selected video image. A processor may enhance, according to the priority, display factors of the video image that has the highest video image priority signal and weaken display factors of the other video images.

Figure 2:
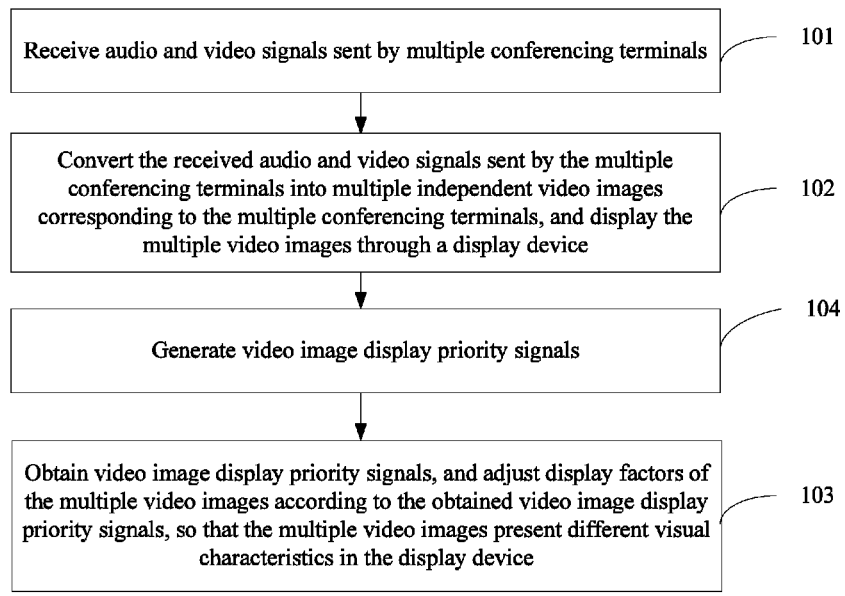
FIG. 2 is a schematic flowchart of another method for highlighting a party of interest in video conferencing according to Embodiment 1.

Furthermore, as shown in FIG. 2, the method further includes the following:

104. Generate video image display priority signals.

In this embodiment, the conferencing terminal A may generate video image display priority signals, so that the conferencing terminal A obtains the video image display priority signals, and adjusts the display factors of the multiple video images according to the obtained video image display priority signals, so that the multiple video images present different visual characteristics in the display device.

Optionally, two methods for generating the video image display priority signals exist.

The first method is: receiving the selective input performed by the user on the multiple video images, and generating the video image display priority signals according to the selective input, where the video image selected by the selective input has the highest video image priority and the video images that are not selected have the priorities lower than that of the selected video image.

Figure 3:
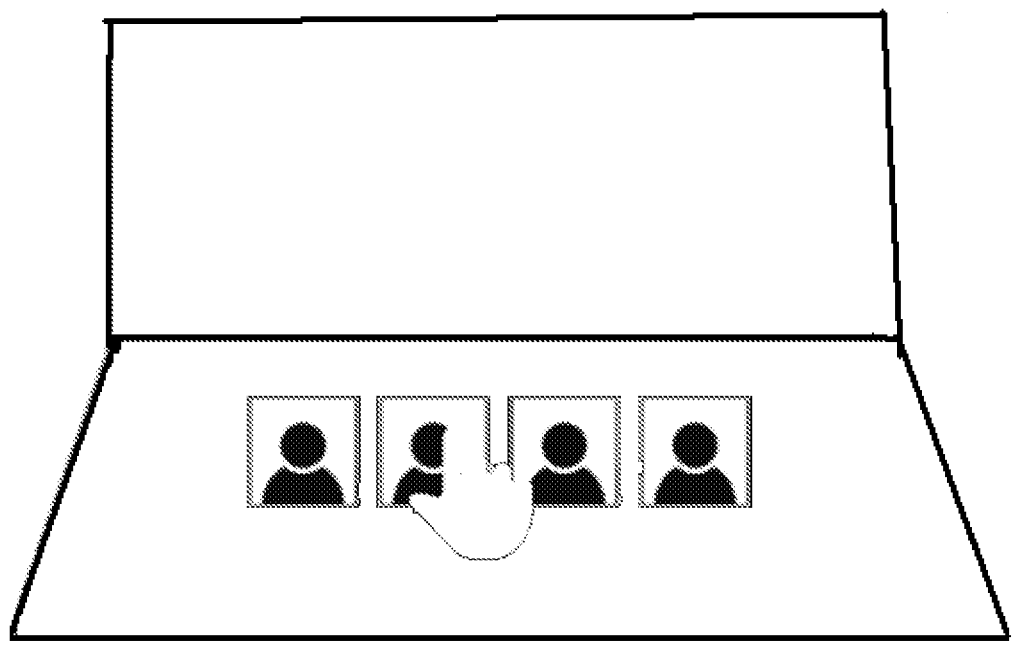
FIG. 3 is a specific scenario of highlighting a party of interest in video conferencing according to Embodiment 1.

Optionally, in this embodiment, the user, namely, the participant A, may perform the selective input on the multiple video images displayed by the display device of the conferencing terminal A. A specific selective input manner may be hovering the mouse pointer and right-clicking or left-clicking a video image of a party of interest selected by the user, or may also be pressing a video image of a party of interest, which is selected by the user, with a finger for a long time if a display of the video terminal is a touch screen, which is not limited herein. FIG. 3 shows that when a user presses a video image of a party of interest, participant B, which is selected by the user, with a finger for a long time, the conferencing terminal A may generate the video image display priority signals according to an input of the user. Optionally, the conferencing terminal A may set the video image selected by the selective input to have the highest video image priority, and set the video images that are not selected to have the priorities lower than that of the selected video image.

Correspondingly, the conferencing terminal A may adjust the display factors of the multiple video images according to the received video image display priority signals. The conferencing terminal A enhances the display factors of the video image that has the highest video image priority signal, and weakens the display factors of the other video images.

Figure 4:
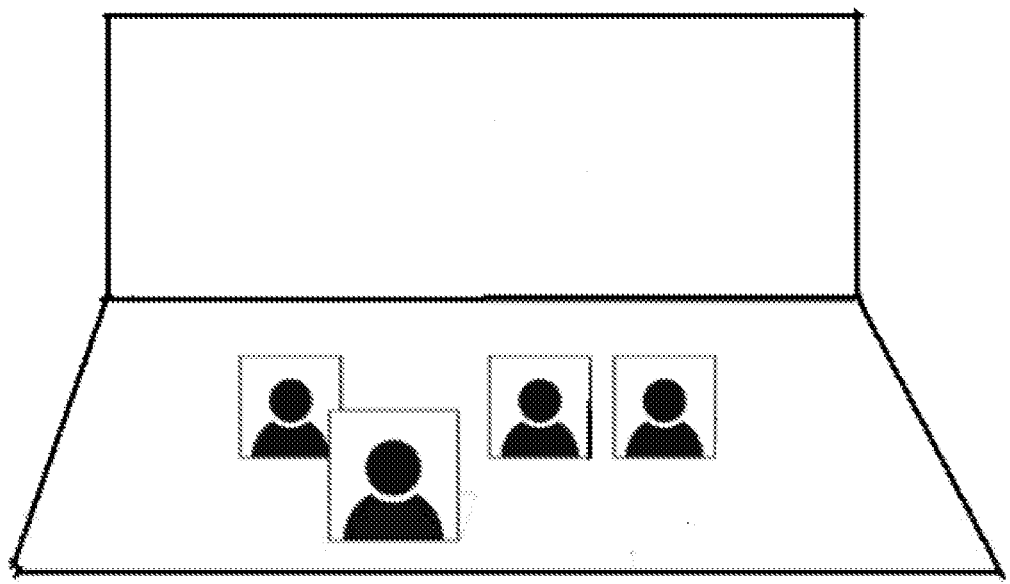
FIG. 4 is another specific scenario of highlighting a party of interest in video conferencing according to Embodiment 1.

When the conference is a three-dimensional (3D) video conference, the conferencing terminal may generate a 3D virtual conferencing environment, and display the 3D virtual conferencing environment through the display device of the conferencing terminal, where the multiple video images are respectively displayed in the 3D virtual conferencing environment. As shown in FIG. 3, when the participant A presses a video image of a party of interest, participant B, which is selected by the user, with a finger for a long time, the conferencing terminal A generates the video image display priority signals according to the selective input of the user, where the video image display priority signals indicate that the video image selected by the selective input has the highest video image priority and that the video images that are not selected have the priorities lower than that of the selected video image. The conferencing terminal A enhances the display factors of the video image that has the highest video image priority signal according to the video image display priority signals, and weakens the display factors of the other video images. Optionally, as shown in FIG. 4, the conferencing terminal A may arrange the video image that has the highest video image priority signal to be in front of the other video images in the 3D virtual conferencing environment. Thereby, the video image of a party of interest, participant B, selected by the user is nearer to the user, which is helpful for the user to pay attention to a video image of the party of interest among the participants and enhances conference efficiency.

Certainly, the participant A may also manually drag the video image of the participant B of interest to the participant A, and move the video image to the front of the other video images, so that the video image of the participant B of interest to the user is nearer to the user, which is helpful for the user to pay attention to the video image of the party of interest among the participants.

Furthermore, optionally, the conferencing terminal may further automatically adjust resolutions of the video images according to position relationships of the video images in the 3D virtual conferencing environment, that is, adjust the resolution of the front most video image in the 3D virtual conferencing environment to a first resolution, and adjust resolutions of video images other than the front most video image to a second resolution, where the first resolution is higher than the second resolution. That is to say, the video image of the participant B of interest to the user is adjusted to a video image of the first resolution to make the video image clearer; and the video images of the participants other than the video image of the party of interest which are located behind in FIG. 4 are adjusted to video images of the second resolution to reduce definitions of the video images. By performing this step, the video image of the party of interest can be highlighted more effectively, so that the user can more effectively pay attention to the party of interest selected by the user; and at the same time, the resolutions of the video images are adjusted, so that a bandwidth for receiving the video image of the party of interest is increased and a bandwidth for receiving the video images of the participants other than the party of interest is reduced, thereby effectively utilizing a bandwidth of a network.

The second method is: detecting audio energy in the audio and video signals sent by the multiple conferencing terminals; and determining audio and video signals sent by the conferencing terminals, of which the audio energy is the highest or the audio energy is higher than a predetermined audio energy threshold, and generating the video image display priority signals according to the determined audio and video signals, where a video image display priority of the audio and video signals of which the audio energy is the highest or the audio energy is higher than a predetermined audio energy threshold is highest.

In step 101 of this embodiment, the conferencing terminal A receives the audio and video signals sent by the multiple conferencing terminals; the conferencing terminal A detects energy of the audio and video signals after receiving the audio and video signals. The video image display priority signals indicate generated according to the audio energy in the audio and video signals, that is, the video image display priority of the audio and video signals of which the audio energy is the highest or the audio energy is higher than a predetermined audio energy threshold is highest. Thereby, a video image of a speaker or a participant whose voice is the loudest among the participants has the highest video image display priority. The conferencing terminal A enhances the display factors of the video image that has the highest video image priority signal according to the video image display priority signals, and weakens the display factors of the other video images. Optionally, as shown in FIG. 4, the conferencing terminal A may arrange the video image that has the highest video image priority to be in front of the other video images in the 3D virtual conferencing environment. Thereby, the video image of the speaker or the participant whose voice is the loudest is nearer to the user, which is helpful for the user to focus on the video image of the speaker or the participant whose voice is the loudest, and enhances the conference efficiency.

In the preceding method, if the video image of which the audio energy is the highest has the highest video image priority, only one such video image exists and if the video image display priority of the audio and video signals of which the audio energy is higher than a predetermined audio energy threshold is highest, multiple such video images exist.

Correspondingly, the conferencing terminal may adjust the display factors of the multiple video images according to the obtained video image display priority signals, which can be: enhancing the display factors of the video image that has the highest video image priority signal, and weakening the display factors of the other video images. When the conference is a 3D video conference, the conferencing terminal may generate a 3D virtual conferencing environment, and display the 3D virtual conferencing environment through the display device, where the multiple video images are respectively displayed in the 3D virtual conferencing environment. Optionally, as shown in FIG. 3, the conferencing terminal A may arrange the video image that has the highest video image priority signal to be in front of the other video images in the 3D virtual conferencing environment. Thereby, the speaker or the participant whose voice is the loudest is highlighted and becomes a party of interest to which the user, namely, the participant A, needs to pay attention to, and the video image of the party of interest is nearer to the user, which is helpful for the user to pay attention to the video image of the speaker or the participant whose voice is the loudest and enhances the conference efficiency.

Furthermore, optionally, the conferencing terminal may further automatically adjust resolutions of the video images according to position relationships of the video images in the 3D virtual conferencing environment, that is, adjust the resolution of the front most video image in the 3D virtual conferencing environment to the first resolution, and adjust resolutions of the video images other than the front most video image to the second resolution, where the first resolution is higher than the second resolution. That is to say, the video image of the party of interest is adjusted to the video image of the first resolution to make the video image clearer; and the video images of the participants other than the video image of the party of interest which are located behind in FIG. 4 are adjusted to the video images of the second resolution to reduce definitions of the video images. By performing this step, the video image of the party of interest can be highlighted more effectively, so that the user can more effectively pay attention to the speaker or the participant whose voice is the loudest; and at the same time, the resolutions of the video images are adjusted, so that the bandwidth for receiving the video image of the party of interest is increased and that the bandwidth for receiving the video images of the participants other than the party of interest is reduced, thereby effectively utilizing bandwidth of the network.

In the preceding two methods provided by the embodiment of the present invention, the first method is applicable to a manual mode, in which the video image of the party of interest to which the user wants to pay attention is selected manually; and the second method is applicable to an automatic mode, in which the conferencing terminal automatically selects the video image of the party of interest. In actual applications, the user may select the manual mode or automatic mode as required to perform a video conference.

The embodiment of the present invention provides a method for highlighting a party of interest in video conferencing. Received audio and video signals sent by multiple conferencing terminals are converted into multiple independent video images corresponding to the multiple conferencing terminals, and the multiple video images are displayed through a display device; and display factors of the multiple video images are adjusted according to obtained video image display priority signals, so that the multiple video images present different visual characteristics in the display device. Thereby, a participant of interest to a user can be effectively highlighted, and conference efficiency is enhanced.

Embodiment 2

Figure 5:
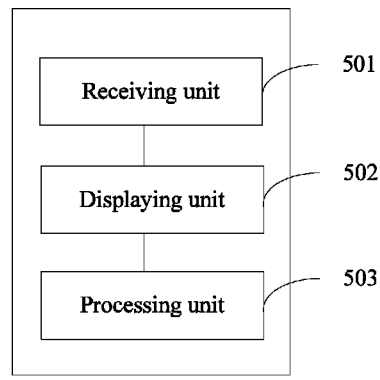
FIG. 5 is a structural block diagram of a device according to Embodiment 2.

The embodiment of the present invention provides a device for implementing the method provided in Embodiment 1. As shown in FIG. 5, the device includes a receiving unit 501, a displaying unit 502, and a processing unit 503.

The receiving unit 501 is configured to receive audio and video signals sent by multiple conferencing terminals.

In video conferencing, each participant has a conferencing terminal, where the conferencing terminal may send audio and video signals of the participant to conferencing terminals of other participants, and may also receive audio and video signals sent by the other conferencing terminals. The receiving unit of the conferencing terminal may receive the audio and video signals sent by the multiple conferencing terminals.

The displaying unit 502 is configured to convert the received audio and video signals sent by the multiple conferencing terminals into multiple independent video images corresponding to the multiple conferencing terminals, and display the multiple video images through a display device.

The displaying unit 502 may convert the received audio and video signals into video images, and display the video images in the display device. It should be noted that the process of converting and displaying video images is based on the prior art, and is not further described herein.

The processing unit 503 is configured to receive video image display priority signals, and adjust display factors of the multiple video images according to the received video image display priority signals, so that the multiple video images present different visual characteristics in the display device.

When the display device displays the video images of the other participants, the processing unit 503 may receive the video image display priority signals, where the video image display priority signals may indicate the priorities of the video images displayed by the display device.

Optionally, a user, namely, the participant A, may perform a selective input on the multiple video images, for example, click a video image of a participant of interest to the user; in this case, the selective input of the participant A is the video image display priority signals. The processing unit 503 adjusts the display factors of the multiple video images directly according to the received selective input of the participant A, namely, the video image display priority signals, so that the multiple video images present different visual characteristics in the display device. Optionally, a video image selected by the selective input has the highest video image priority, and video images that are not selected have priorities lower than that of the selected video image. The processing unit 503 may enhance, according to the priority, display factors of the video image that has the highest video image priority signal, and weaken display factors of the other video images.

Figure 6:
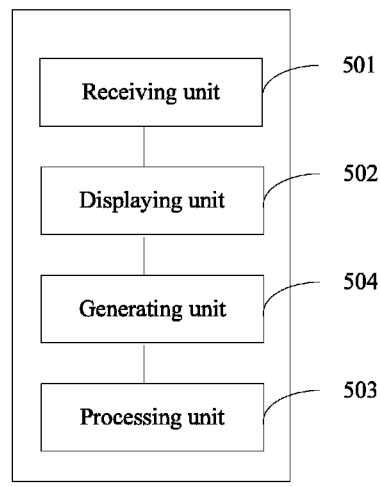
FIG. 6 is a structural block diagram of another device according to Embodiment 2.

Furthermore, as shown in FIG. 6, the device further includes a generating unit 504.

The generating unit 504 is configured to generate video image display priority signals, and transmit the video image display priority signals to the processing unit.

Optionally, the generating unit 504 may receive the selective input of the user with respect to the multiple video images, and generate the video image display priority signals according to the selective input, where the video image selected by the selective input has the highest video image priority and the video images that are not selected have the priorities lower than that of the selected video image.

The processing unit 503 is configured to enhance the display factors of the video image that has the highest video image priority signal, and weaken the display factors of the other video images. Optionally, the processing unit 503 is specifically configured to arrange the video image that has the highest video image priority signal to be in front of the other video images in a 3D virtual conferencing environment, adjust the resolution of the front most video image in the 3D virtual conferencing environment to a first resolution, and adjust resolutions of video images other than the front most video image to a second resolution, where the first resolution is higher than the second resolution.

Figure 7:
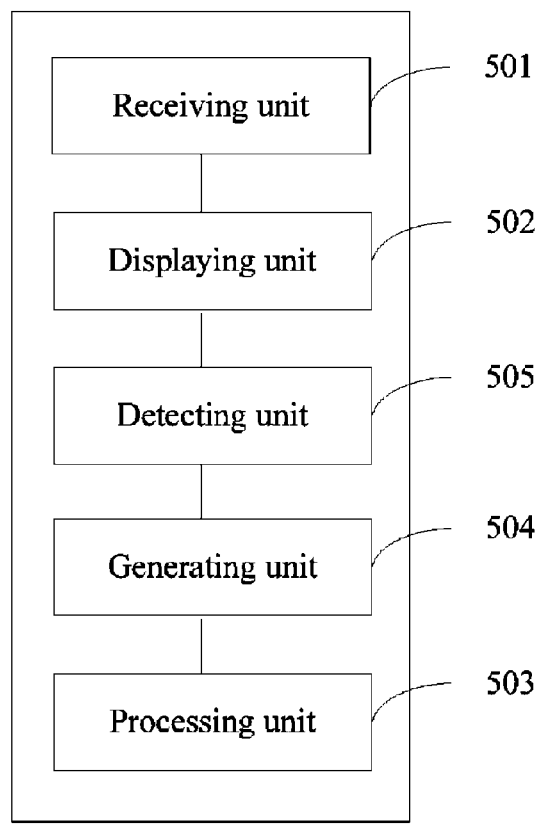
FIG. 7 is a structural block diagram of another device according to Embodiment 2.

Furthermore, as shown in FIG. 7, the device further includes a detecting unit 505.

The detecting unit 505 is configured to detect audio energy in the audio and video signals sent by the multiple conferencing terminals.

In this case, the generating unit 504 is specifically configured to receive the selective input of the user with respect to the multiple video images, and generate the video image display priority signals according to the selective input, where the video image selected by the selective input has the highest video image priority and the video images that are not selected have the priorities lower than that of the selected video image.

The processing unit 503 is configured to enhance the display factors of the video image that has the highest video image priority signal, and weaken the display factors of the other video images. Optionally, the processing unit 503 is specifically configured to arrange the video image that has the highest video image priority signal to be in front of the other video images in the 3D virtual conferencing environment, adjust the resolution of the front most video image in the 3D virtual conferencing environment to the first resolution, and adjust resolutions of the video images other than the front most video image to the second resolution, where the first resolution is higher than the second resolution.

The embodiment of the present invention provides a device. Received audio and video signals sent by multiple conferencing terminals are converted into multiple independent video images corresponding to the multiple conferencing terminals, and the multiple video images are displayed through a display device; and display factors of the multiple video images are adjusted according to obtained video image display priority signals, so that the multiple video images present different visual characteristics in the display device. Thereby, a participant of interest to a user can be effectively highlighted, and conference efficiency is enhanced.

Embodiment 3

Figure 8:
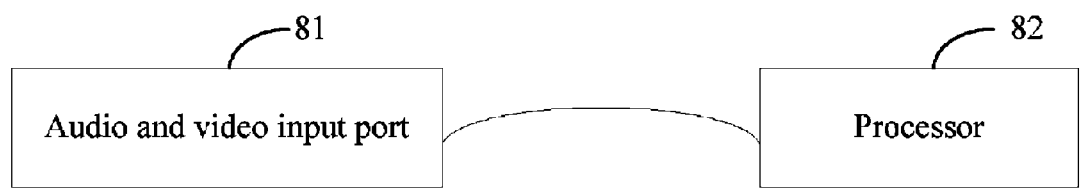
FIG. 8 is a system according to Embodiment 3.

The embodiment of the present invention provides a system, including the units described in Embodiment 2, and used for implementing the method in Embodiment 1. As shown in FIG. 8, the system includes: an audio and video input port 81 and a processor 82.

The audio and video input port 81 is configured to receive audio and video signals sent by multiple conferencing terminals. The audio and video input port 81 includes the receiving unit 501 described in Embodiment 2.

The processor 82 is configured to: convert the received audio and video signals sent by the multiple conferencing terminals into multiple independent video images corresponding to the multiple conferencing terminals, and display the multiple video images through a display device; receive video image display priority signals, and adjust display factors of the multiple video images according to the received video image display priority signals, so that the multiple video images present different visual characteristics in the display device.

The processor 82 is further configured to generate video image display priority signals. Specifically, the processor 82 receives a selective input performed by the user on the multiple video images, and generates the video image display priority signals according to the selective input, where the video image display priority signals indicate that a video image selected by the selective input has the highest video image priority and video images that are not selected have priorities lower than that of the selected video image; or the processor 82 detects audio energy in the audio and video signals sent by the multiple conferencing terminals, and generates the video image display priority signals according to the audio energy in the audio and video signals, where the video image display priority signals indicate that a video image display priority of audio and video signals of which the audio energy is the highest or the audio energy is higher than a predetermined audio energy threshold is highest.

Correspondingly, that the processor 82 adjusts display factors of the multiple video images according to the received video image display priority signals specifically includes: The processor 82 enhances display factors of the video image that has the highest video image priority signal, and weakens display factors of the other video images. Optionally, the processor 82 may arrange the video image that has the highest video image priority signal to be in front of the other video images in a 3D virtual conferencing environment, adjust the resolution of the front most video image in the 3D virtual conferencing environment to a first resolution, and adjust resolutions of video images other than the front most video image to a second resolution, where the first resolution is higher than the second resolution.

The embodiment of the present invention provides a system. Received audio and video signals sent by multiple conferencing terminals are converted into multiple independent video images corresponding to the multiple conferencing terminals, and the multiple video images are displayed through a display device; and display factors of the multiple video images are adjusted according to obtained video image display priority signals, so that the multiple video images present different visual characteristics in the display device. Thereby, a participant of interest to a user can be effectively highlighted, and conference efficiency is enhanced.

Persons of ordinary skill in the art may understand that all or part of the steps of the preceding method embodiments may be implemented by a program instructing relevant hardware. The program may be stored in a computer readable storage medium. When the program is run, the preceding steps of the method embodiments are performed. The storage medium may be any medium capable of storing program codes, such as a read-only memory (ROM), a random-access memory (RAM), a magnetic disk, or an optical disk.

The foregoing descriptions are merely specific embodiments of the present invention, but are not intended to limit the protection scope of the present invention. Any variation or replacement readily figured out by persons skilled in the art which falls within the technical scope disclosed by the present invention shall fall within the protection scope of the present invention. Therefore, the protection scope of the present invention shall be subject to the protection scope of the appended claims.

What is claimed is:

1. A method for highlighting a party of interest in video conferencing, comprising:
   receiving audio and video signals sent by multiple conferencing terminals;
   converting the received audio and video signals sent by the multiple conferencing terminals into multiple independent video images corresponding to the multiple conferencing terminals;
   displaying the multiple video images through a display device;
   obtaining one or more video image display priority signals;
   adjusting display factors of the multiple video images according to the obtained video image display priority signals such that the multiple video images present different visual characteristics in the display device;
   detecting audio energy in the audio and video signals sent by the multiple conferencing terminals; and
   generating the video image display priority signals according to the audio energy in the audio and video signals,
   wherein the video image display priority signals indicate that a video image display priority of audio and video signals of which the audio energy is the highest or the audio energy is higher than a predetermined audio energy threshold is highest, and
   wherein adjusting display factors of the multiple video images according to the received video image display priority signals specifically comprises enhancing the display factors of the video image that has the highest video image priority and weakening the display factors of the other video images.

2. The method according to claim 1, wherein obtaining one or more video image display priority signals comprises receiving a selective input performed by the user on the multiple video images, and generating the video image display priority signals according to the selective input, wherein the video image display priority signals indicate that a video image selected by the selective input has the highest video image priority and video images that are not selected have priorities lower than that of the selected video image, and wherein adjusting display factors of the multiple video images according to the received video image display priority signals specifically comprises enhancing display factors of the video image that has the highest video image priority and weakening display factors of the remaining video images.

3. The method according to claim 1, further comprising generating a 3D virtual conferencing environment and displaying the 3D virtual conferencing environment through the display device, wherein the multiple video images are respectively displayed in the 3D virtual conferencing environment.

4. The method according to claim 3, wherein enhancing the display factors of the video image that has the highest video image priority and weakening the display factors of the other video images specifically comprises arranging the video image that has the highest video image priority to be in front of the remaining video images in the 3D virtual conferencing environment.

5. The method according to claim 4, wherein automatically adjusting resolutions of the video images according to position relationships of the video images in the 3D virtual conferencing environment specifically comprises:
   adjusting the resolution of the front most video image in the 3D virtual conferencing environment to a first resolution; and adjusting resolutions of video images other than the front most video image to a second resolution, wherein the first resolution is higher than the second resolution.

6. A device, comprising:
a receiving unit configured to receive audio and video signals sent by multiple conferencing terminals;
a displaying unit configured to convert the received audio and video signals sent by the multiple conferencing terminals into multiple independent video images corresponding to the multiple conferencing terminals, and display the multiple video images through a display device;
a processing unit configured to obtain one or more video image display priority signals, and adjust display factors of the multiple video images according to the obtained video image display priority signals such that the multiple video images present different visual characteristics in the display device; and
a detecting unit configured to detect audio energy in the audio and video signals sent by the multiple conferencing terminals,
wherein the generating unit is specifically further configured to generate the video image display priority signals according to the audio energy in the audio and video signals,
wherein the video image display priority signals indicate that a video image display priority of audio and video signals of which the audio energy is the highest or the audio energy is higher than a predetermined audio energy threshold is highest, and
wherein the processing unit is specifically configured to enhance the display factors of the video image that has the highest video image priority and weaken the display factors of the other video images.

7. The device according to claim 6, wherein the processing unit is configured to receive a selective input performed by the user on the multiple video images, and generate the video image display priority signals according to the selective input, wherein the video image display priority signals indicate that a video image selected by the selective input has the highest video image priority and video images that are not selected have priorities lower than that of the selected video image, and wherein the processing unit is specifically configured to enhance display factors of the video image that has the highest video image priority and weaken display factors of the other video images.

8. The device according to claim 6, wherein the displaying unit is further configured to generate a 3D virtual conferencing environment, and display the 3D virtual conferencing environment through the display device, wherein the multiple video images are respectively displayed in the 3D virtual conferencing environment.

9. The device according to claim 8, wherein the processing unit is specifically configured to arrange the video image that has the highest video image priority to be in front of the other video images in the 3D virtual conferencing environment, adjust the resolution of the front most video image in the 3D virtual conferencing environment to a first resolution, and adjust resolutions of video images other than the front most video image to a second resolution, wherein the first resolution is higher than the second resolution.

10. A system, comprising:
an audio and video input port configured to receive audio and video signals sent by multiple conferencing terminals; and
a processor configured to:
convert the received audio and video signals sent by the multiple conferencing terminals into multiple independent video images corresponding to the multiple conferencing terminals, and display the multiple video images through a display device; and
obtain video image display priority signals, and adjust display factors of the multiple video images according to the obtained video image display priority signals such that the multiple video images present different visual characteristics in the display device,
wherein the processor is further configured to generate video image display priority signals,
wherein the processor receives a selective input performed by the user on the multiple video images, and generates the video image display priority signals according to the selective input,
wherein the video image display priority signals indicate that a video image selected by the selective input has the highest video image priority and video images that are not selected have priorities lower than that of the selected video image, or wherein the processor detects audio energy in the audio and video signals sent by the multiple conferencing terminals, and generates the video image display priority signals according to the audio energy in the audio and video signals,
wherein the video image display priority signals indicate that a video image display priority of audio and video signals of which the audio energy is the highest or the audio energy is higher than a predetermined audio energy threshold is highest, and
wherein adjusting, by the processor, display factors of the multiple video images according to the obtained video image display priority signals specifically comprises enhancing, by the processor, display factors of the video image that has the highest video image priority and weakening display factors of the other video images.

11. The system according to claim 10, wherein enhancing, by the processor, display factors of the video image that has the highest video image priority and weakening display factors of the other video images specifically comprise arranging, by the processor, the video image that has the highest video image priority to be in front of the other video images in the 3D virtual conferencing environment, adjusting the resolution of the front most video image in the 3D virtual conferencing environment to a first resolution, and adjusting resolutions of video images other than the front most video image to a second resolution, wherein the first resolution is higher than the second resolution.

* * * * *